(12) United States Patent
Barcatta

(10) Patent No.: US 8,561,302 B1
(45) Date of Patent: Oct. 22, 2013

(54) ELECTRICALLY DRIVEN LINEAR CUTTER

(71) Applicant: Frank August Barcatta, Fallbrook, CA (US)

(72) Inventor: Frank August Barcatta, Fallbrook, CA (US)

( * ) Notice: Subject to any disclaimer, the term of this patent is extended or adjusted under 35 U.S.C. 154(b) by 0 days.

(21) Appl. No.: 13/757,818

(22) Filed: Feb. 3, 2013

(51) Int. Cl.
*B26B 27/00* (2006.01)
*B26B 1/00* (2006.01)

(52) U.S. Cl.
USPC .................................. 30/95; 30/320; 30/334

(58) Field of Classification Search
USPC ............... 30/92, 95, 103, 105–107, 182–185, 30/228, 241–243, 113, 110, 109, 120.2, 30/122, 334, 320; 7/138, 142, 157, 158; 81/180.1; 83/74, 399
See application file for complete search history.

(56) References Cited

U.S. PATENT DOCUMENTS

| | | | | |
|---|---|---|---|---|
| 147,699 A * | 2/1874 | Smith | ........................... | 81/185.1 |
| 324,145 A * | 8/1885 | Miller | ............................... | 7/143 |
| 439,336 A * | 10/1890 | Zitlow | ............................... | 81/437 |
| 914,199 A * | 3/1909 | Stiren | ............................... | 7/138 |
| 1,496,716 A * | 6/1924 | Lundqvist | ........................... | 7/142 |
| 1,542,307 A * | 6/1925 | Kennedy | ........................... | 81/150 |
| 1,558,036 A * | 10/1925 | Moffitt | ............................... | 7/142 |
| 2,249,786 A * | 7/1941 | Sacerdote | ........................... | 81/128 |
| 2,305,706 A * | 12/1942 | Henry | ............................... | 30/122 |
| 2,590,031 A * | 3/1952 | Petersen | ........................... | 7/133 |
| 2,653,638 A * | 9/1953 | Nelson | ........................... | 30/120.2 |
| 2,725,774 A * | 12/1955 | Tekse | ............................... | 30/102 |
| 4,403,416 A * | 9/1983 | Adachi | ............................... | 30/273 |
| 4,960,016 A * | 10/1990 | Seals | ............................... | 81/177.4 |
| 5,033,552 A * | 7/1991 | Hu | ............................... | 173/217 |
| 5,315,759 A * | 5/1994 | Mashata | ........................... | 30/97 |
| 5,379,542 A * | 1/1995 | Guzman | ........................... | 42/95 |
| D378,340 S * | 3/1997 | Harter | ............................... | D8/60 |
| 5,953,822 A * | 9/1999 | Vogelsanger | ........................... | 30/228 |
| 6,014,810 A * | 1/2000 | Earle et al. | ........................... | 30/92 |
| 6,044,564 A * | 4/2000 | Jeltsch | ............................... | 30/228 |
| 6,336,270 B1 * | 1/2002 | Dureiko | ............................... | 30/102 |
| 7,587,777 B2 * | 9/2009 | Ogburn | ............................... | 7/138 |
| 2009/0241351 A1 * | 10/2009 | Maniwa et al. | ........................... | 30/228 |
| 2009/0322166 A1 * | 12/2009 | Satterfield et al. | ............. | 310/50 |
| 2010/0064527 A1 * | 3/2010 | Lee et al. | ........................... | 30/228 |
| 2010/0186235 A1 * | 7/2010 | Schwartz et al. | ................. | 30/95 |
| 2011/0005083 A1 * | 1/2011 | Scott et al. | ........................... | 30/92 |
| 2011/0185579 A1 * | 8/2011 | Pellenc | ............................... | 30/228 |
| 2011/0258859 A1 * | 10/2011 | Schofield et al. | .............. | 30/228 |
| 2013/0008031 A1 * | 1/2013 | Thorson et al. | ................... | 30/94 |

* cited by examiner

*Primary Examiner* — Sean Michalski
*Assistant Examiner* — Jonathan G Riley

(57) ABSTRACT

This invention, through a novel arrangement of basic elements, has resulted in a brand new tool not previously available. This non-obvious implementation provides an electromechanical machine which is both useful and is easily operated. This invention can be arranged as a cutting device for cutting various items such as, but not limited to, plastic irrigation pipe and tree branches or, alternately, with a jaw attached in place of the cutting blade as a clamp or wrench. It accomplishes this by using a small battery powered electric motor and through appropriate reduction gearing drives a drive screw to produce a linear motion of a cutter blade or jaw. The mechanical advantages afforded by the reduction gearing and the drive screw produce sufficient force to perform as a powerful cutter or wrench/clamp.

1 Claim, 4 Drawing Sheets

ELECTRICALLY DRIVEN LINEAR CUTTER

BACKGROUND

As a recreational gardener I have used various tools to prune trees and bushes and to cut plastic irrigation pipe. These tools require a certain amount of strength to operate and can be difficult to use, especially the tree pruners, with their cords and pulleys which make them frustratingly hard to position and operate. In my mind I had envisioned several alternatives. Nothing seemed to do the job. And then it finally all came together in this invention—the Electrically Driven Linear Cutter. Subsequently I realized that, as an alternate embodiment, this tool has uses beyond what was originally envisioned as a simple gardening tool. With the addition of a jaw shaped head in place of the cutter blade the device becomes an electrically adjustable wrench and an electrically adjustable clamp.

SUMMARY

This invention uses a small, battery-powered electric motor which, through appropriate reduction gearing and a drive screw, drives a cutter blade forward toward an anvil. The item to be cut is placed between the blade and the anvil and is severed as the blade advances. The force to do this is accomplished by the reduction gearing which considerably magnifies the output torque of the motor which is then applied to a drive screw converting the rotation of the motor to a linear motion of the cutter. Depending on the reduction gear ratios and the linear thread count of the drive screw a considerable force can be applied to the cutter blade. Limit switches or digital encoding of the rotation of the motor sense the position of the cutter blade and, operating through an electronics module, can stop the flow of electricity to the motor when the cutter blade is at its extreme open or closed position. A typical operating sequence would be to place the tool on the item to be cut, activate the forward motion of the cutter with the forward switch button and then, at the completion of the cut, retract the blade to its starting position with the reverse switch. You are then ready to make another cut. When the tool is used with the jaw attached instead of the cutter blade the operation is similar. When used as a wrench the jaws are positioned around the nut, bolt or pipe as the case may be and the unit is activated until a snug fit is achieved. The operation is the same when used as a clamp.

FIGURES

Figure 6:
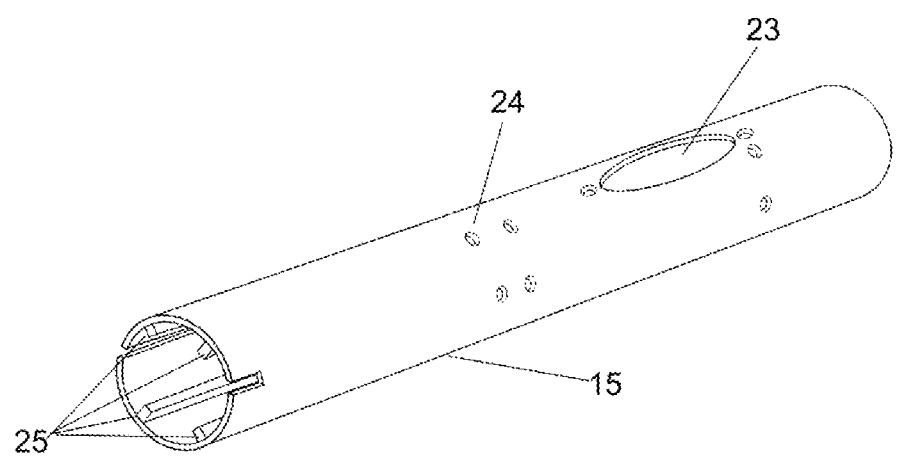

FIG. 6 provides details of the outer housing including guide rails and position sensors.

Figure 7:
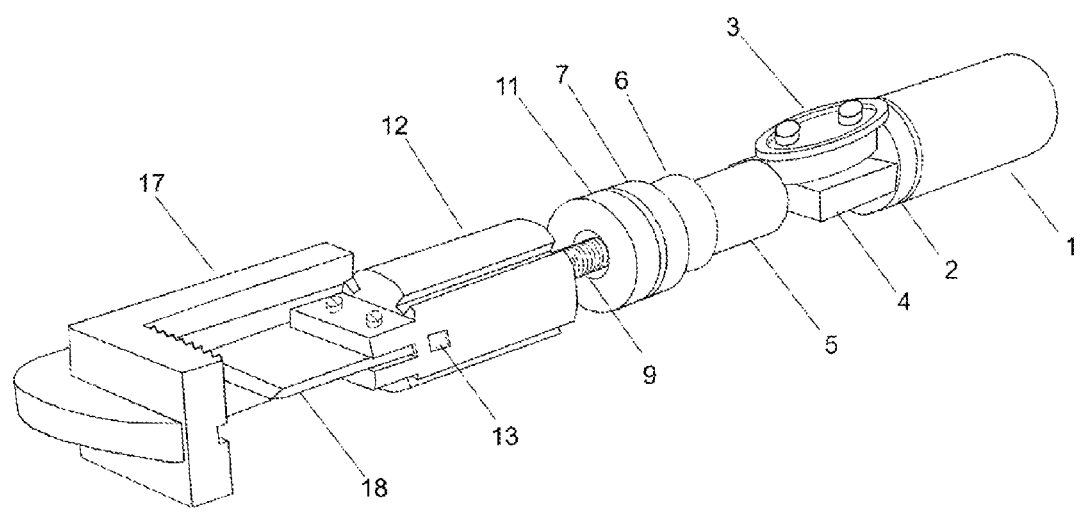

FIG. 7 is a view of the assembled unit without the outer housing to show the arrangement of the internal components.

DETAILED DESCRIPTION

Figure 1:
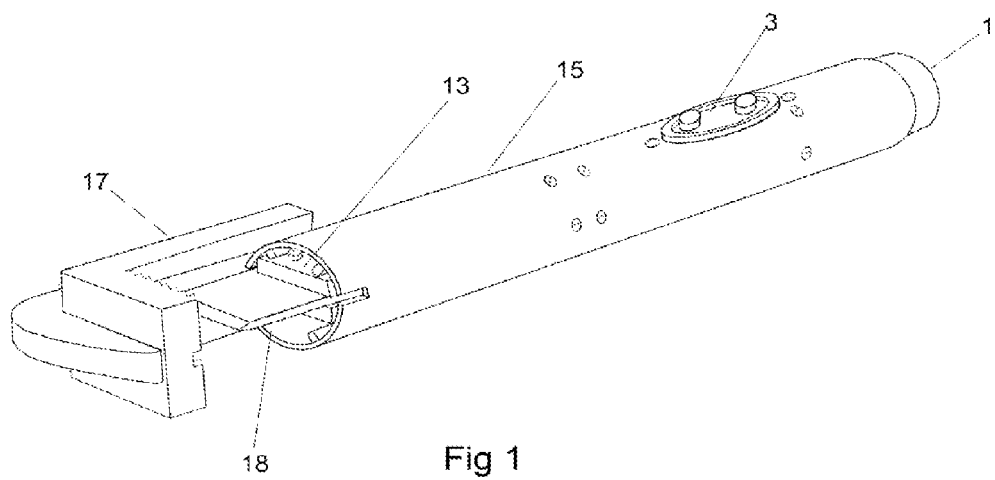
FIG. 1 shows a view of the assembled unit in its embodiment as a cutting device.

The Electrically Driven Linear Cutter depicted in FIG. 1 is a hand held device that can be used to cut many diverse items such as plastic pipe or, on an extension pole, branches on a tree. It takes all the work out of these chores. Simply place the item to be cut between the face of the Anvil 17 and the Cutter Blade 18, press the switch and in a few seconds you are done. The unit can also be used as a wrench or clamp as an alternate embodiment when the Cutter Blade 18 is replaced with a Jaw 19 as shown in FIG. 2

The essence of this invention relies on the mechanical advantage provided by the multiplication of the torque of the Motor 5 through a set of gears in the Gearhead 6 and then the conversion of the high torque rotary motion to a forceful linear motion with the Drive Screw 9. The linear motion drives the Cutter Blade 18 forward against the item to be cut and the Anvil 17, and severs the item. When used as a wrench/clamp the linear motion drives the Jaw 19 forward to a tight fit.

FIG. 1 is a view of the unit in its cutting configuration. The various parts visible here are discussed in detail in what follows.

Figure 2:
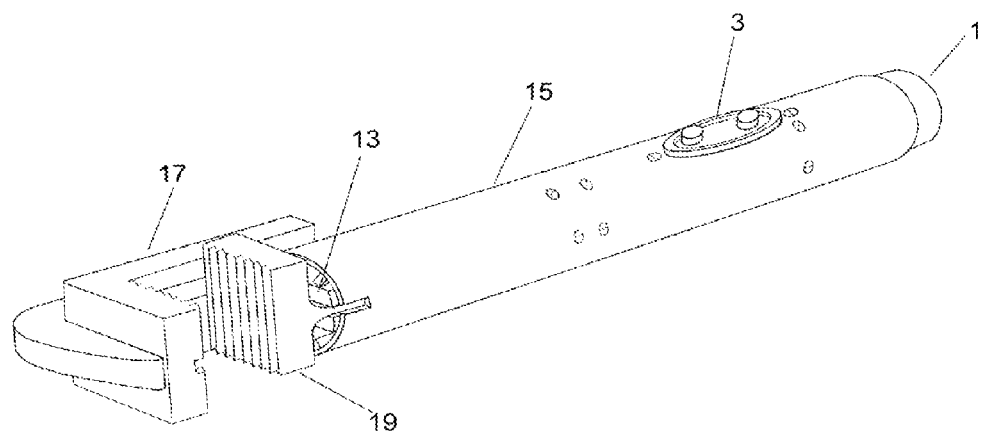
FIG. 2 shows a view of the assembled unit in its alternate embodiment as a wrench/clamp.

FIG. 2 is a view of the unit in its wrench configuration. As above, details will follow.

Figure 3:
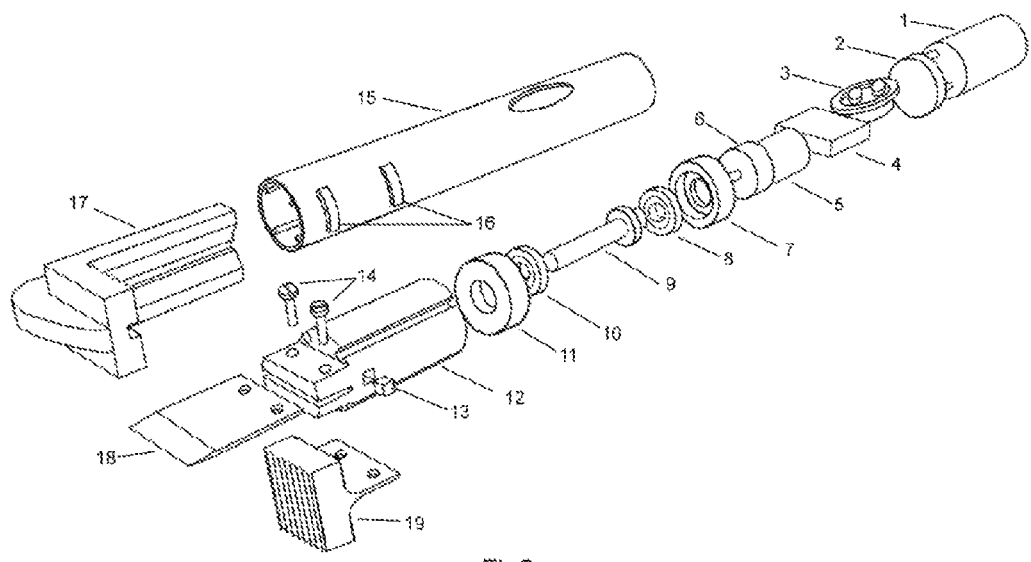
FIG. 3 is an exploded view showing all of the elements comprising the device.

FIG. 3 is an exploded view of the unit showing all of its parts.

The Battery 1 is a standard rechargeable battery and is removable from the unit to allow for recharging and also to allow for the insertion of a charged backup battery. It protrudes from the back of the housing for easy removal as shown in FIG. 2.

The Connector 2 is the connection between the battery and the switching electronics unit and is also the rear mount for the outer housing. It provides for a secure connection of the battery but also allows for easy battery removal and replacement. Alternate means of securing the battery are possible.

The Switch 3 is a two button unit which allows the operator to control the direction of movement of the Cutter Blade 17 or Jaw 18. Besides the switch there are several other options for controlling the direction of motion and the force applied to the Cutter Blade 17 or Jaw 18.

In the embodiment shown in FIG. 3, the Switching Electronics Unit 4 communicates with the Limit Switches 16 and interrupts the current to the motor at the preset extremes of motion. An alternate to using the Limit Switches 16 to determine end-of-travel is to use a motor mounted digital encoder. The signal from the encoder is processed by the Switching Electronics Unit 4 which provides the information necessary to stop the motion.

A further embellishment is to monitor the current to the Motor 5 or through a signal from a strain gauge mounted on the Jaw 19 or Cutter Blade 18 to determine the force being applied. Using this mode of operation a preset force can be set and maintained through control of the current to the Motor 5 by the Switching Electronics Unit 4. This can be beneficial especially when using the unit as a wrench or clamp.

The Motor 5 is a direct current motor whose direction of rotation can be reversed by changing the polarity of the input voltage. The Gearhead 6 attached to the motor reduces the output rotational speed of the motor to a low value and, in doing so, greatly increases the output torque. It is coupled directly to the Drive Screw 9 but with some axial play to allow for thermal expansion.

The Drive Screw 9 is a threaded rod which threads into the Holder 12. Depending on the direction of rotation it either pushes away or pulls back on the Holder 12. It has a shoulder at the back end which is retained between two thrust bearings. This prevents the screw itself from moving either forward or backward. This also protects the mechanical connection to the Motor 5.

There are two bearings and thrust plates. These are located on either side of the shoulder on the Drive Screw 9 to prevent it from moving either forward or backward and provide a near frictionless motion for the Holder 12. The bearings are an important element of the design. Without them, friction could become so high as to prevent the unit from operating properly. The Rear Thrust Plate 7 is mounted to the Housing 15 and is recessed to accept the Rear Bearing 8, the outer race of which is pressed into the Rear Thrust Plate 7. The inner race presses against the shoulder on the Drive Screw 9. Similarly, the Front Thrust Plate 11 and Front Bearing 10 are located on the front side of the Drive Screw 9 shoulder to provide restraint in the forward direction.

Figures 4A, 4B:
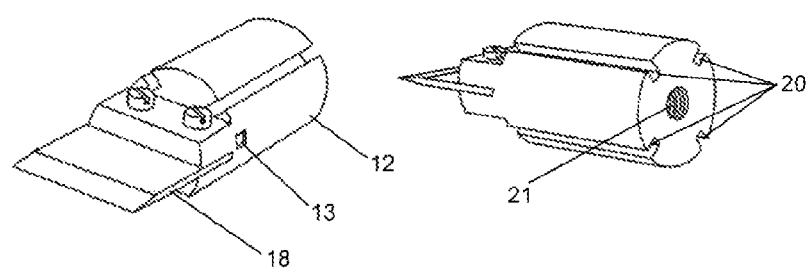
FIG. 4A and FIG. 4B show two views of the blade holder which provide details of the guide grooves and blade attachment.

Details of the Holder 12 and Blade 18 are shown in the two views in FIGS. 4A and 4B. As shown, the Cutter Blade 18 is attached directly to the holder. It is easily removable to allow for cleaning or replacement. The Magnet 13 embedded in the side activates the two Reed Switches 16 which are mounted on the Housing 15. These signal the end of travel of the Holder 12 to stop the forward or rearward motion. The Guide Grooves 20 around the periphery of the Holder 12 match the guide rails in the Housing 15 and insure that the holder and the blade will not rotate during operation. The Threaded Hole 21 through the Holder 12 is threaded to match the Drive Screw 9. As the Drive Screw 9 rotates, the Holder 12 moves linearly— either moving the Blade 18 forward or retracting the Blade 18.

Figures 5A, 5B:
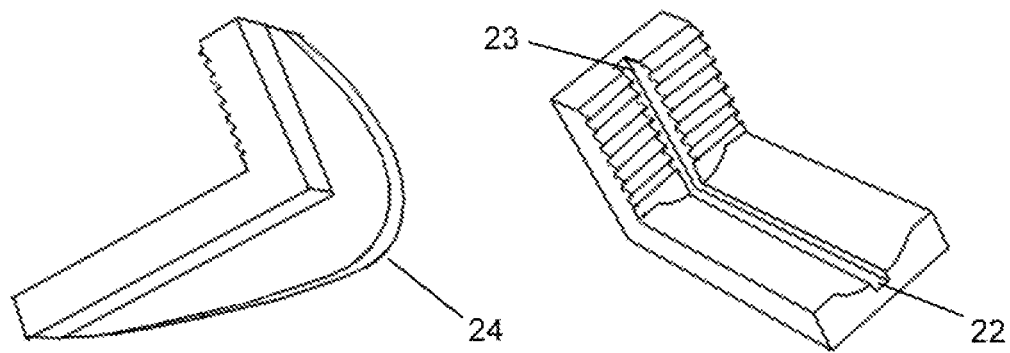
FIG. 5A and FIG. 5B show two views of the anvil detailing guide and relief grooves.

Two views of the Anvil 17 are shown in FIG. 5A and FIG. 5B. There are two grooves on the inner surfaces of the Anvil 17. The Restraint Groove 22 stabilizes the Blade 18 as it moves forward and the Relief Groove 23 provides an area where the Blade can come to rest. The relief area allows the Blade 18 to travel slightly beyond the face of the Anvil 17 to ensure a clean cut and also to protect the edge of the Blade 18. Extra strength is incorporated on the back side of the Anvil 71 through the use of a metal fin called the Backbone 24, for lack of a better word.

Details of the Housing 15 are depicted in FIG. 6. The Housing 15 is basically a cylindrical tube to which is mounted the other elements of the unit. The figure shows the location of the Guide Rails 25 which confine the Holder 12 to a linear motion as described earlier. Also shown is a representative Screw Hole 24 for mounting the components and a larger Switch Hole 23 for the Switch 3.

The overall view of the assembled unit (shown without the outer housing for clarity) is depicted in the FIG. 7. The Jaw 19 would replace the Blade 18 to convert the unit to its alternate wrench configuration. This is one of many possible arrangements of the invention. For example, as a tree pruner, the Battery 1, Switch 3 and Switching Electronics 4 would be at the bottom of an extendable pole and the remaining components would be at the top. A flexible electrical cable would connect the two ends. Also manufacturing considerations and power requirements can influence size and shape.

I claim:

1. An electromechanical device for cutting and clamping, comprising:
    a. a housing, the housing having a first end and a second end, an axis, and an aperture that extends through the housing in the direction of the axis;
    b. a battery;
    c. an on/off switch spaced from the first end of the housing and located on an exterior housing surface, wherein the on/off switch connects the battery with a motor; the motor is located within the aperture of the housing;
    d. a gear reduction assembly is attached to the motor, the gear reduction assembly is secured within the aperture of the housing and oriented in a parallel direction with the axis;
    e. a drive screw coupled to the gear reduction assembly at a first drive screw end, the drive screw is further provided with a second drive screw end and a drive screw axis, the drive screw axis is parallel with the axis of the housing, the first drive screw end is aligned within the aperture of the housing, and the second drive screw end is aligned within the aperture of the housing, the second drive screw end is attached to a moveable holder, having a first holder end and a second holder end;
    f. the aperture at the second end of the housing receives the moveable holder, the second end of the housing is provided with a guiding surface within the aperture, the moveable holder is provided with a complementary guiding surface, wherein the guiding surface and the complementary guiding surface cooperate to enable the moveable holder to move, in the direction of the housing axis, within the aperture of the housing;
    g. the movable holder is provided with a second holder end, and located between the first holder end and the second holder end is a magnet, the second holder end is provided with a fastener for alternately securing either one of a provided jaw and blade;
    h. a controller comprising a first and second reed switches and a control circuit, the first and second read switches are spaced from one another, wherein the first and second reed switches cooperate with the magnet to signal the end of travel of the movable holder in order to stop the movement of the moveable holder;
    i. an anvil protruding from the second end of the housing.

* * * * *